(12) United States Patent
Tomizawa et al.

(10) Patent No.: US 8,446,435 B2
(45) Date of Patent: May 21, 2013

(54) DISPLAY DEVICE

(75) Inventors: Kazunari Tomizawa, Kizugawa (JP); Kozo Nakamura, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1355 days.

(21) Appl. No.: 11/817,530

(22) PCT Filed: Apr. 20, 2006

(86) PCT No.: PCT/JP2006/308301
§ 371 (c)(1),
(2), (4) Date: Aug. 31, 2007

(87) PCT Pub. No.: WO2006/115165
PCT Pub. Date: Nov. 2, 2006

(65) Prior Publication Data
US 2009/0021534 A1    Jan. 22, 2009

(30) Foreign Application Priority Data
Apr. 22, 2005  (JP) .................... 2005-125382

(51) Int. Cl.
*G09G 5/00* (2006.01)

(52) U.S. Cl.
USPC .............. 345/690; 345/72; 345/88; 345/83; 345/694

(58) Field of Classification Search
USPC .. 345/55, 690, 694–695, 72, 83, 88; 359/625, 359/627, 619, 487, 620, 621, 624, 626, 495, 359/337, 41, 290
See application file for complete search history.

(56) References Cited

U.S. PATENT DOCUMENTS

| 5,113,274 A | 5/1992 | Takahashi et al. |
| 5,684,552 A * | 11/1997 | Miyamoto et al. ............ 349/106 |
| 2002/0067330 A1 | 6/2002 | Okuzono |
| 2004/0189626 A1 | 9/2004 | Mori |
| 2004/0246350 A1 * | 12/2004 | Sakamoto ..................... 348/241 |
| 2005/0083277 A1 * | 4/2005 | Credelle ........................ 345/87 |

FOREIGN PATENT DOCUMENTS

| JP | 01-314084 A | 12/1989 |
| JP | 06-324649 A | 11/1994 |
| JP | 07-181472 A | 7/1995 |
| JP | 11-338435 A | 12/1999 |
| JP | 2002-236466 A | 8/2002 |
| JP | 2003-295833 A | 10/2003 |
| JP | 2004-117431 A | 4/2004 |
| JP | 2004-152737 A | 5/2004 |
| JP | 2004-264442 A | 9/2004 |
| JP | 2005-62220 A | 3/2005 |
| JP | 2005-128190 A | 5/2005 |

OTHER PUBLICATIONS

Official communication issued in International Application No. PCT/JP2006/308301, mailed on May 23, 2006.

* cited by examiner

*Primary Examiner* — Lun-Yi Lao
*Assistant Examiner* — Olga Merkoulova
(74) *Attorney, Agent, or Firm* — Keating & Bennett, LLP (57) ABSTRACT

A display device has an improved white balance in white display and excellent display quality, and includes a plurality of pixels each including four sub-pixels More specifically, the display device includes a plurality of pixels each including: a sub-pixel pair of a red (R) sub-pixel and a green (G) sub-pixel; and a sub-pixel pair of a blue (B) sub-pixel and a green (G) sub-pixel, wherein in most of the pixels, a product of an aperture area per sub-pixel and a light amount per unit aperture area, in each of the red (R) sub-pixel and the blue (B) sub-pixel, is approximately two times that of the green (G) sub-pixel.

11 Claims, 9 Drawing Sheets

| R | G | B | R | G | B | R | G | B |
|---|---|---|---|---|---|---|---|---|
| + | − | + | − | + | − | + | − | + |

| R | G | B | R | G | B | R | G | B |
|---|---|---|---|---|---|---|---|---|
| − | + | − | + | − | + | − | + | − |

Fig. 14B

| R | G | B | R | G | B | R | G | B |
|---|---|---|---|---|---|---|---|---|
| − | + | − | + | − | + | − | + | − |

| R | G | B | R | G | B | R | G | B |
|---|---|---|---|---|---|---|---|---|
| + | − | + | − | + | − | + | − | + |

Fig.15A

| R | G | B | G | R | G | B | G | R |
|---|---|---|---|---|---|---|---|---|
| + | − | + | − | + | − | + | − | + |

| B | G | R | G | B | G | R | G | B |
|---|---|---|---|---|---|---|---|---|
| − | + | − | + | − | + | − | + | − |

Fig. 15B

| R | G | B | G | R | G | B | G | R |
|---|---|---|---|---|---|---|---|---|
| − | + | − | + | − | + | − | + | − |

| B | G | R | G | B | G | R | G | B |
|---|---|---|---|---|---|---|---|---|
| + | − | + | − | + | − | + | − | + |

| R | G | B | G | R | G | B | G | R |
|---|---|---|---|---|---|---|---|---|
| − | + | + | − | + | − | − | + | − |

| B | G | R | G | B | G | R | G | B |
|---|---|---|---|---|---|---|---|---|
| + | − | − | + | − | + | + | − | + |

DISPLAY DEVICE

BACKGROUND OF THE INVENTION

1. Field of the Invention

The present invention relates to display devices including a display screen constituted by a plurality of pixels. More specifically, the present invention relates to a display device which includes a display screen constituted by a plurality of pixels and which can be used in a liquid crystal display, a PDP (Plasma Display Panel), an organic EL (Electroluminescent) display, a FED (Field Emission Display), and the like.

2. Description of the Related Art

Various thin display devices such as a liquid crystal display, a PDP (Plasma Display Panel), an organic EL (Electroluminescent) display, and a FED (Field Emission Display) have been widely used as such a display device, recently. For these display devices, further improvement in performances is needed. For example, further reduction in size and improvement in resolution are needed for a liquid crystal display used in a cellular phone and the like. In order to satisfy such demands, the resolution needs to be increased without increasing an area of a display region. A method of reducing the size of a sub-pixel constituting a pixel and simultaneously increasing the number of pixels may be mentioned as a method of realizing such needs. However, a wiring for supplying image signals to sub-pixels constituting each pixel and a thin film transistor for driving the pixel need to be formed in one pixel. Therefore, if the size of the sub-pixel is reduced, the aperture ratio is reduced and sufficient brightness in the display screen can not be obtained. In this respect, there is room for improvement.

Figure 1A:
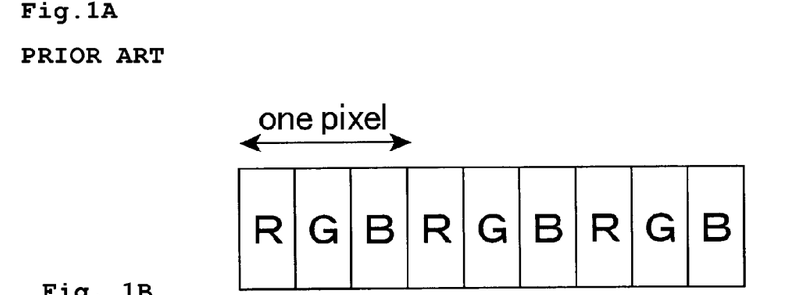
FIG. 1A is a schematic view showing an array of a commonly used pixel (RGB pixel) including one each of red (R), blue (B), and green (G) sub-pixels.
Figure 1B:
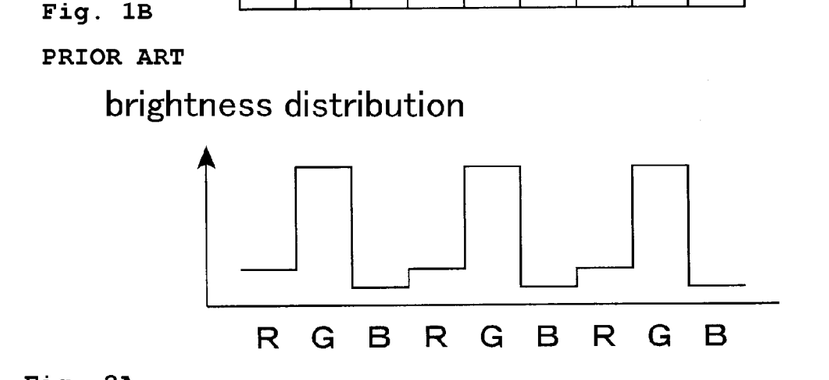
FIG. 1B is a schematic view showing a brightness distribution of the RGB pixel.

For this problem, a method of changing a sub-pixel arrangement in one pixel, thereby increasing an apparent resolution without increasing the number of pixels may be mentioned (for example, refer to Japanese Kokai Publication No. Hei-06-324649 and Japanese Kokai Publication No. 2004-152737). The resolution is generally proportional to the number of pixels, but the apparent resolution is determined by a brightness distribution in one pixel. The display device such as a liquid crystal display generally includes pixels constituted by three sub-pixels of red (R), green (G), and blue (B) as shown in FIG. 1A (for example, refer to Japanese Kokai Publication No. Hei-07-181472). In this case, the brightness distribution has one peak in one pixel, as shown in FIG. 1B.

Figure 2A:
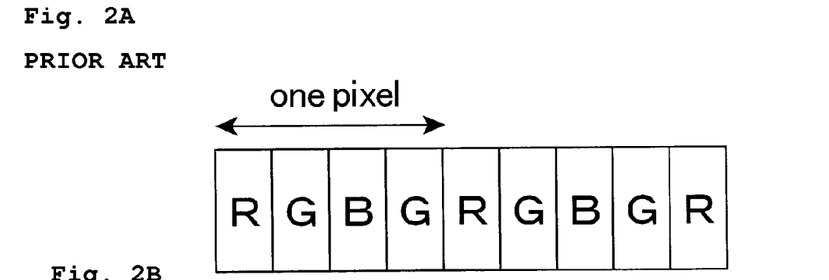
FIG. 2A is a schematic view showing an array of a pixel (RGBG pixel) including a sub-pixel pair of a red (R) sub-pixel and a green (G) sub-pixel and a sub-pixel pair of a blue (B) sub-pixel and a green (G) sub-pixel.
Figure 2B:
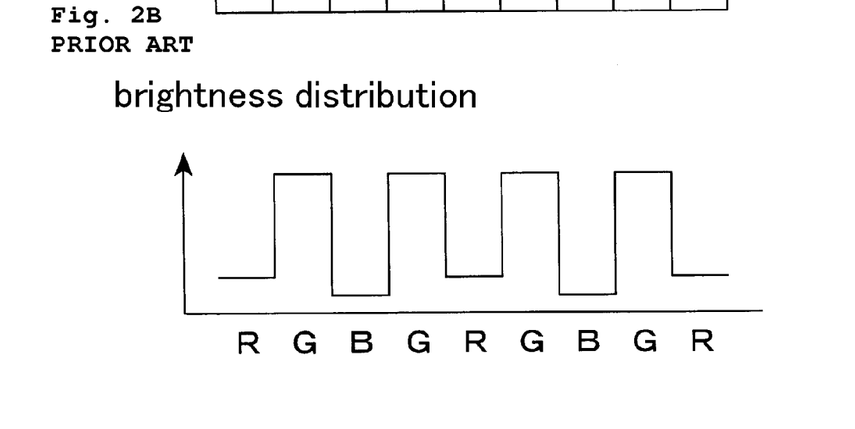
FIG. 2B is a schematic view showing a brightness distribution of the RGBG pixel.

In contrast, in the sub-pixel arrangement proposed in a conventional device, as shown in FIG. 2A, one pixel is constituted by four sub-pixels of red (R), green (G), blue (B), and green (G), and the brightness distribution has two peaks in one pixel, as shown in FIG. 2B. Accordingly, this one pixel is apparently equivalent to two pixels. That is, if one pixel is constituted by four sub-pixels of R, G, B, and G, the resolution that is 1.5 times that in one pixel constituted by three sub-pixels of R, G, and B can be apparently obtained even if the number of pixels is the same. However, if the sub-pixels of the respective colors having the same size are displayed at maximum brightness, white balance is shifted to the green side and the display quality is reduced because the number of the G sub-pixel in one pixel is two times that of the R or B sub-pixel. In such a respect, there is room for improvement in order to provide a display device displaying an image constituted by a pixel including four sub-pixels of R, G, B, and G.

SUMMARY OF THE INVENTION

In order to overcome the problems described above, preferred embodiments of the present invention provide a display device in which white balance in white display is improved and excellent display quality can be obtained when an image is displayed by a pixel in a sub-pixel array having an improved apparent resolution, that is, by a pixel including four sub-pixels of R, G, B, and G.

The present inventors made various investigations of a display device which displays an image constituted by pixels each including: a sub-pixel pair of a red (R) sub-pixel and a green (G) sub-pixel; and a sub-pixel pair of a blue (B) sub-pixel and a green (G) sub-pixel, thereby improving an apparent resolution without increase in the number of pixels. The present inventors discovered that if the sub-pixels of the respective colors are displayed at maximum brightness, white balance is shifted to green (G) side and the display quality is reduced because the number of the green (G) sub-pixel in one pixel is larger than the number of the blue (B) or red (R) sub-pixel by one sub-pixel. Then, the inventors found that the white balance can be improved if a light amount per sub-pixel in each of the red (R) and blue (B) sub-pixels is approximately two times that of the green (G) sub-pixel. That is, the aperture area and the light amount per unit aperture area in the sub-pixels of the respective colors are adjusted, and thereby the above-mentioned problems can be advantageously solved. As a result, preferred embodiments of the present invention have been completed.

According to a preferred embodiment of the present invention, a display device includes a plurality of pixels each including: a sub-pixel pair of a red (R) sub-pixel and a green (G) sub-pixel; and a sub-pixel pair of a blue (B) sub-pixel and a green (G) sub-pixel, wherein in most of the pixels, a product of an aperture area per sub-pixel and a light amount per unit aperture area, in each of the red (R) sub-pixel and the blue (B) sub-pixel, is approximately two times that of the green (G) sub-pixel.

The above-mentioned sub-pixel is a display unit capable of being independently driven and controlled, and the sub-pixel is generally a minimum display unit controlled by an image signal supplied from a data signal line. In preferred embodiments of the present invention, a set of at least three sub-pixels of red (R), blue (B), and green (G) constitutes a pixel, and thereby color display in the display device can be realized.

The above-mentioned sub-pixel pair is a pair of sub-pixels constituted by two or more adjacent or continuous sub-pixels. In preferred embodiments of the present invention, "including a sub-pixel pair of a red (R) sub-pixel and a green (G) sub-pixel; and a sub-pixel pair of a blue (B) sub-pixel and a green (G) sub-pixel" means "including a sub-pixel array in which red (R) and green (G) sub-pixels are combined and a sub-pixel array in which blue (B) and green (G) sub-pixels are combined." That is, the sub-pixel pair of a red (R) sub-pixel and a green (G) sub-pixel and the sub-pixel pair of a blue (B) sub-pixel and a green (G) sub-pixel do not have to be disposed adjacently or continuously. For example, a preferred embodiment in which a white (W) sub-pixel and the like is included between the sub-pixel pair of a red (R) sub-pixel and a green (G) sub-pixel and the sub-pixel pair of a blue (B) sub-pixel and a green (G) sub-pixel may be provided.

The display device of the present invention is not especially limited as long as it performs display using three colors of red (R), blue (B), and green (G). A liquid crystal display, an organic electroluminescent display device, and the like are preferable as the display device according to various preferred embodiments of the present invention.

In preferred embodiments of the present invention, the pixels mainly include a pixel in which a product of an aperture area per sub-pixel and a light amount per unit aperture area, in each of the red (A) sub-pixel and the blue (B) sub-pixel, is approximately two times that of the green (G) sub-pixel. Further, it is preferable that in the red (R) and blue (B) sub-pixels in every pixel, the product of the aperture area per sub-pixel and the light amount per unit aperture area is approximately two times that of the green (G) sub-pixel. The above-mentioned light amount means a transmitted light amount if the display device according to preferred embodiments of the present invention is a liquid crystal display device and the like, and it means an emission amount if it is an organic electroluminescent display device and the like.

The red (R) sub-pixel according to a preferred embodiment of the present invention preferably is a sub-pixel performing display mainly using light with a wavelength of about 570 nm to about 780 nm and preferably is a sub-pixel performing display using light, about 90% or more of which has a wavelength of about 605 nm to about 700 nm. The green (G) sub-pixel according to a preferred embodiment of the present invention preferably is a sub-pixel performing display mainly using light with a wavelength of about 500 nm to about 570 nm and preferably is a sub-pixel performing display using light, about 90% or more of which has a wavelength of about 500 nm to about 560 nm. Further, the blue (B) sub-pixel according to a preferred embodiment of the present invention is a sub-pixel performing display mainly using light with a wavelength of about 430 nm to about 500 nm and preferably is a sub-pixel performing display using light, about 90% or more of which has a wavelength of about 435 nm to about 480 nm. The red (R), green (G), and blue (B) according to a preferred embodiment of the present invention preferably include monochromatic lights at about 700.0 nm, about 546.1 nm, and about 435.8 nm, respectively, as defined in CIE (Commission Internationale de l'Eclairage).

In the display device according to various preferred embodiments of the present invention, white balance in white display is improved and excellent display quality is obtained because an image is displayed by a pixel in a sub-pixel array capable of improving the apparent resolution, that is, by a pixel including four sub-pixels of R, G, B, and G.

It is preferable that the pixel (RGBG pixel) including the sub-pixel pair of a red (R) sub-pixel and a green (G) sub-pixel and the sub-pixel pair of a blue (B) sub-pixel and a green (G) sub-pixel according to a preferred embodiment of the present invention has an arrangement in which the green (G) sub-pixels are not adjacent to each other along a horizontal line. It is generally known that the green (G) sub-pixel has a brightness higher than that of the other two sub-pixels. Therefore, a uniform display image can be obtained in such an arrangement in which the green (G) sub-pixels are not adjacent to each other.

It is preferable in the display device according to a preferred embodiment of the present invention that in most of the pixels, an aperture area per sub-pixel in each of the red (R) sub-pixel and the blue (B) sub-pixel is approximately two times that of the green (G) sub-pixel. As a result, the white balance can be improved and reduction in display quality can be prevented without adjusting the light amount per unit aperture area by changing design of a backlight or a color filter if an image is displayed by the RGBG pixel in which the number of the green (G) sub-pixel is larger than that of the red (R) or blue (B) sub-pixel by one sub-pixel.

It is preferable in the display device according to a preferred embodiment of the present invention that in most of the pixels, a light amount per unit aperture area in each of the red (R) sub-pixel and the blue (B) sub-pixel is approximately two times that of the green (G) sub-pixel. The light amount can be adjusted by changing a design of a backlight or a color filter.

As a result, the white balance can be improved and reduction in display quality can be prevented without adjusting the aperture area of the sub-pixels of the respective colors if an image is displayed by the RGBG pixel in which the number of the green (G) sub-pixel is larger than the number of the red (R) or blue (B) sub-pixel by one sub-pixel.

It is preferable that the display device according to a preferred embodiment of the present invention includes a backlight, and in the backlight, an emission intensity of each of red (R) and blue (B) is approximately two times that of green (G). The design of the backlight is changed such that the emission intensity of each of red (R) and blue (B) is approximately two times that of green (G), and thereby the white balance can be improved and reduction in display quality can be prevented if an image is displayed by the RGBG pixel in which the number of the green (G) sub-pixel is larger than the number of the red (R) or blue (B) sub-pixel by one sub-pixel. A hot cathode fluorescent tube and a cold cathode fluorescent tube, for example, may be used as the backlight in which the emission intensity of each of red (R) and blue (B) is approximately two times that of green (G).

It is preferable in the display device according to a preferred embodiment of the present invention that sub-pixels are arranged in the order of red (R), green (G), blue (B), green (G). As a result, the display quality can be improved. As for a preferred embodiment of the pixel in such a display device, sub-pixels may be arranged in the order of red (R), green (G), blue (B), and green (G), or in the order of green (G), red (R), green (G), and blue (B), or in the order of blue (B), green (G), red (R), and green (G).

It is preferable in the display device according to a preferred embodiment of the present invention that an image signal with the sub-pixel pair as a signal unit is generated for each color, and each of the red (R) sub-pixel and the blue (B) sub-pixel is driven by an averaged image signal obtained by subjecting two or more image signals corresponding to continuous sub-pixel pairs to average processing. A signal used in a conventional pixel (RGB pixel) constituted by three sub-pixels of red (R), green (G), and blue (B) (RGB pixel) is input into a driving circuit as it is, as the image signal corresponding to the green (G) sub-pixel, and thereby the green (G) sub-pixel can be displayed. However, image signals input into the red (R) sub-pixel and the blue (B) sub-pixel need to be adjusted depending on the sub-pixel arrangement of the various preferred embodiments of the present invention. For example, a red (R) image signal input into the sub-pixel pair of the blue (B) sub-pixel and the green (G) sub-pixel is not used for display. Therefore, even if the same number of red (R) and blue (B) image signals as of green (G) image signals is input into a driving circuit, half each of the red (R) image signals and the blue (B) image signals are not used for display, and the red (R) sub-pixel and the blue (B) sub-pixel can not faithfully reflect the image signal contents in display. As mentioned above, if each of the red (R) sub-pixel and the blue (B) sub-pixel is driven by an averaged image signal obtained by subjecting two or more image signals corresponding to continuous sub-pixel pairs to average processing, every red (R) and blue (B) image signal can be used for display, and therefore high-resolution display quality can be maintained.

The display device according to various preferred embodiments of the present invention may be a display device displaying an image constituted by pixels each including a sub-pixel pair of a red (R) sub-pixel, a green (G) sub-pixel, and a white (W) sub-pixel, and a sub-pixel pair of a blue (B) sub-pixel, a green (G) sub-pixel, and a white (W) sub-pixel, in which the white (W) sub-pixel is arranged for improvement in brightness.

It is preferable that in the average processing, the averaged image signal is generated by: converting the two or more image signals from tone values to brightness values; from the brightness values, obtaining an averaged value; and reconverting the averaged value to a tone value. The resolution observed by human eyes (apparent resolution) is influenced by not only the number of the pixels (actual resolution) but also the brightness distribution. In contrast, the image signal that is not brightness data but tone data is used in a commonly used display device. Therefore, even if two or more image signals to be input are subjected to average processing in a low-pass filter, the averaged value is not an averaged brightness value but an averaged tone value, and therefore, an ideal brightness value can not be obtained in each of the red (R) and blue (B) sub-pixels. Therefore, if each of the red (R) and blue (B) sub-pixel is driven by the averaged image signal generated by: converting the two or more image signals from tone values to brightness values; from the brightness values, obtaining an averaged value; and reconverting the averaged value to a tone value, red (R) and blue (B) can be displayed at ideal brightness values, respectively.

It is preferable that in the averaged image signal, a combination of sub-pixel pairs used for the average processing is different between an image signal input into the red (R) sub-pixel and an image signal input into the blue (B) sub-pixel. In comparison to the case where the same low-pass filter is used in the average processing of the red (R) and blue (B) image signals, image signals which are more suitable for the red (R) and blue (B) sub-pixel arrangement according to various preferred embodiments of the present invention are input into the red (R) and blue (B) sub-pixels, respectively.

It is preferable in the display device that the red (R) sub-pixel and the blue (B) sub-pixel are connected to a common data signal line. Thus, the data signal line corresponding to the sub-pixel arrangement of various preferred embodiments of the present invention can be secured without increase in the data signal line.

It is preferable that the display device according to a preferred embodiment of the present invention includes a driving circuit having an input side to which first and second input lines are connected and an output side to which first and second data signal lines are connected, wherein the first input line supplies a mixed signal of image signals corresponding to the red (R) sub-pixel and the blue (B) sub-pixel to the first data signal line, and the second input line supplies an image signal corresponding to the green (G) sub-pixel to the second data signal line. As a result, the data output from the driving circuit can correspond to the sub-pixel even if a common data signal line is connected to the red (R) sub-pixel and the blue (B) sub-pixel. That is, according to a driving circuit corresponding to the RGBG pixel of a preferred embodiment of the present invention, image signals (data) used when an image is constituted by a conventional RGB pixel are rearranged before being input into the driving circuit, to correspond to the sub-pixel arrangement of preferred embodiments of the present invention. As a result, the image can be displayed by the RGBG pixels of preferred embodiments of the present invention. The mixed signal supplied from the above-mentioned first input line means a signal including an image signal corresponding to the red (R) sub-pixel and an image signal corresponding to the blue (B) sub-pixel, the image signals being alternately arranged.

It is preferable that the display device includes a driving circuit having an input side to which first, second, and third input lines are connected and an output side to which data signal lines are connected, wherein each of the first, second, and third input lines supplies a mixed signal of image signals corresponding to the red (R) sub-pixel, the green (G) sub-pixel, and the blue (B) sub-pixel to the data signal lines. As a result, the data output from the conventional driving circuit, used when an image is displayed by RGB pixels (driving circuit for RGB pixels), can correspond to the sub-pixel even if the red (R) sub-pixel and the blue (B) sub-pixel are connected to a common data signal. That is, the image signals (data) used when an image is constituted by the RGB pixel are rearranged before being input into the driving circuit, to correspond to the sub-pixel arrangement of preferred embodiments of the present invention. As a result, using the commonly used driving circuit for RGB pixels, an image can be displayed by the RGBG pixels of preferred embodiments of the present invention.

It is preferable that the display device has a display portion including pixels disposed in a grid pattern and a polarity of a tone voltage applied to a sub-pixel is inverted between adjacent pixels, lines, and frames. If one polarity voltage is applied to liquid crystals and the like for a long time, a bias of the charge of the pixel causes a burn-in phenomenon. In order to prevent this burn-in phenomenon, alternating current driving is needed, and the polarity of the tone voltage applied to adjacent sub-pixels needs to be inverted, and the polarity of the tone voltage applied to each sub-pixel also needs to be inverted between adjacent frames. Therefore, if an image is displayed by commonly used RGB pixels, the polarity of the tone voltage is inverted between sub-pixels, lines, and frames. However, if the polarity of the tone voltage is inverted by the commonly used method when an image is displayed by the RGBG pixels of preferred embodiments of the present invention, the tone voltage has the same polarity between adjacent sub-pixels of the same color on the line. In this case, no problems are caused if the brightness of a positive polarity and that of a negative polarity are the same. However, the brightness really varies between the positive polarity and the negative polarity, and therefore the brightness varies from line to line. Accordingly, it is preferable that the polarity is inverted between the adjacent sub-pixels of the same color on the line. The polarity of the tone voltage applied to the adjacent sub-pixels of the same color can be inverted if the polarity of the tone voltage applied to the sub-pixels is inverted between adjacent pixels, lines, and frames, and the polarity of the tone is inverted between the adjacent sub-pixels of the same color on the line. Thereby, adverse effects caused by the variation of the brightness between the positive polarity and the negative polarity can be prevented. The above-mentioned line may be a vertical row or horizontal row of the pixels arranged in a grid pattern. This inversion method provides the same effects also if an image is displayed by pixels arranged in a stripe pattern where sub-pixels of the same color are arranged on the vertical line. If an image is displayed by the pixels in a stripe pattern, a vertical straight line displayed by a single color of red (R), blue (B), and the like can be prevented from being displayed in a zigzag manner.

The configuration of the display device of the present invention is not especially limited as long as such components are included, and other components may or may not be included.

According to the display device of various preferred embodiments of the present invention, white balance in white display is improved and excellent display quality is obtained because an image is displayed by a pixel in a sub-pixel array capable of improving a resolution, that is, by a pixel including four sub-pixels of R, G, B, and G.

Other features, elements, steps, advantages and characteristics of the present invention will become more apparent from the following detailed description of preferred embodiments thereof with reference to the attached drawings.

BRIEF DESCRIPTION OF THE DRAWINGS

FIG. 11A shows an odd line, and FIG. 11B shows an even line.

FIG. 13A shows an odd line, and FIG. 13B shows an even line.

FIG. 14A shows a current frame, and FIG. 14B shows a next frame.

FIG. 15A shows a current frame, and FIG. 15B shows a next frame.

FIG. 16A shows a current frame, and FIG. 16B shows a next frame.

FIG. 17A shows a current frame, and FIG. 17B shows a next frame.

DETAILED DESCRIPTION OF PREFERRED EMBODIMENTS

The present invention is described in more detail below with reference to preferred embodiments using drawings, but the present invention is not limited to only these preferred embodiments.

First Preferred Embodiment

A display device which displays an image using pixels (RGBG pixels) each including a sub-pixel pair of a red (R) sub-pixel and a green (G) sub-pixel and a sub-pixel pair of a blue (B) sub-pixel and a green (G) sub-pixel is mentioned below. A conventional pixel constituted by three sub-pixels of red (R), green (G), and blue (B) is hereinafter referred to as a RGB pixel.

(1) White Balance in Pixel

If an image is constituted by the RGBG pixel, there is an advantage that an apparent resolution can be improved because a brightness distribution has two peaks in one pixel. However, if an image signal for a conventional RGB pixel is used as an image signal for driving a sub-pixel when the image is displayed by the RGBG pixel, the number of the green (G) sub-pixel in one pixel is larger than that of the red (R) sub-pixel or the blue (B) sub-pixel, and therefore the white balance is shifted to the green (G) side if the sub-pixels of the respective colors are displayed at maximum brightness. Methods (1 to 3) for improving white balance according to preferred embodiments of the present invention are described below.

Method for Improving White Balance 1: Change of Aperture Area in Sub-Pixel

Figure 3A:
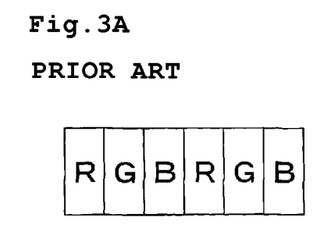
FIG. 3A is a schematic view showing a commonly used array of sub-pixels in adjacent two RGB pixels.
Figure 3B:
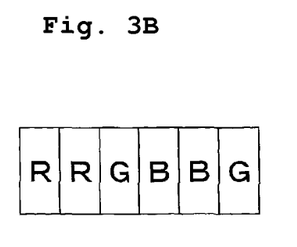
FIG. 3B is a schematic view showing an RGBG pixel according to a preferred embodiment of the present invention, artificially reproduced by rearranging the sub-pixels in FIG. 3A.
Figure 3C:
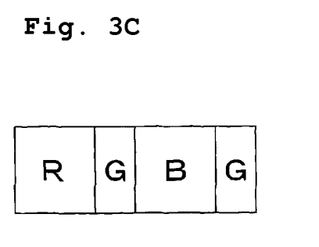
FIG. 3C is a schematic view showing an RGBG pixel according to a preferred embodiment of the present invention, in which an area in each of the red (R) sub-pixel and the blue (B) sub-pixel is approximately two times that of the green (G) sub-pixel.

FIG. 3A shows commonly used two RGB pixels (constituted by sub-pixels arranged in order of R, G, B, R, G, B). In this case, each of the red (R), blue (B), and green (G) sub-pixels in one pixel has the same aperture area and the problem of white balance shifted to the green (G) side is not generated. In order to find an optimal configuration of the RGBG pixel based on this commonly used RGB pixel shown in FIG. 3A, the commonly used two RGB pixels are rearranged to have a sub-pixel arrangement corresponding to the color array of the RGBG pixel according to a preferred embodiment of the present invention. As a result, the sub-pixels are arranged in order of R, R, G, B, B, G, as shown in FIG. 3B. Thus, the sub-pixels are arranged in order of R, G, B, G according to a preferred embodiment of the sub-pixel arrangement shown in FIG. 3B. In addition, the preferred embodiment of the RGBG pixel in which white balance equivalent to that of the pixels in FIG. 3A is obtained is a preferred embodiment in which an aperture area in each of the red (R) sub-pixel and the blue (B) sub-pixel is approximately two times that of the green (G) pixel, as shown in FIG. 3C. In this case, the red (R) sub-pixel or the blue (B) sub-pixel in one pixel has the same aperture area as in the green (G) sub-pixel, and therefore the white balance is not shifted to the green (G) side.

It is preferable that the horizontal and vertical size of each sub-pixel is designed such that each of the pair of the red (R) and green (G) sub-pixels and the pair of the blue (B) and green (G) sub-pixels has a quadrate shape. As a result, the sub-pixel pairs can be arranged with no space therebetween, which is preferable in view of color filter design. Even if a ratio of the red (R) or blue (B) sub-pixel to the green (G) sub-pixel is 2 to 1 in terms of the aperture area in order to improve the white balance, a ratio of the red (R) or blue (B) sub-pixel to the green (G) sub-pixel is not always 2 to 1 in terms of horizontal length when each sub-pixel pair has a quadrate shape. That is, the aperture area of the sub-pixel varies because of the presence of the wiring, the thin film transistor, and the like, and therefore, the size of the sub-pixels of the respective colors needs to be designed in such a way that the ratio of the aperture area of the sub-pixels of the respective colors and the horizontal and vertical lengths of the sub-pixels of the respective colors satisfy the desired conditions, respectively.

If the pixel has the above-mentioned configuration, the green (G) sub-pixel which exerts an important effect on the apparent resolution increases, and therefore the apparent resolution can be increased. In contrast, each of the red (R) sub-pixel and the blue (B) sub-pixel has a brightness lower than that of the green (G) sub-pixel, and therefore hardly exerts an effect on the apparent resolution. Therefore, the red (R) sub-pixel and the blue (B) sub-pixel can be used for color adjustment. Accordingly, the RGBG pixel according to a preferred embodiment of the present invention is not considered to exert an effect on color display (color reproduction range) although the number of the red (R) sub-pixel and the blue (B) sub-pixel is smaller than that of the green (G) sub-pixel.

Method for Improving White Balance 2: Change of Backlight Design

Figure 18:
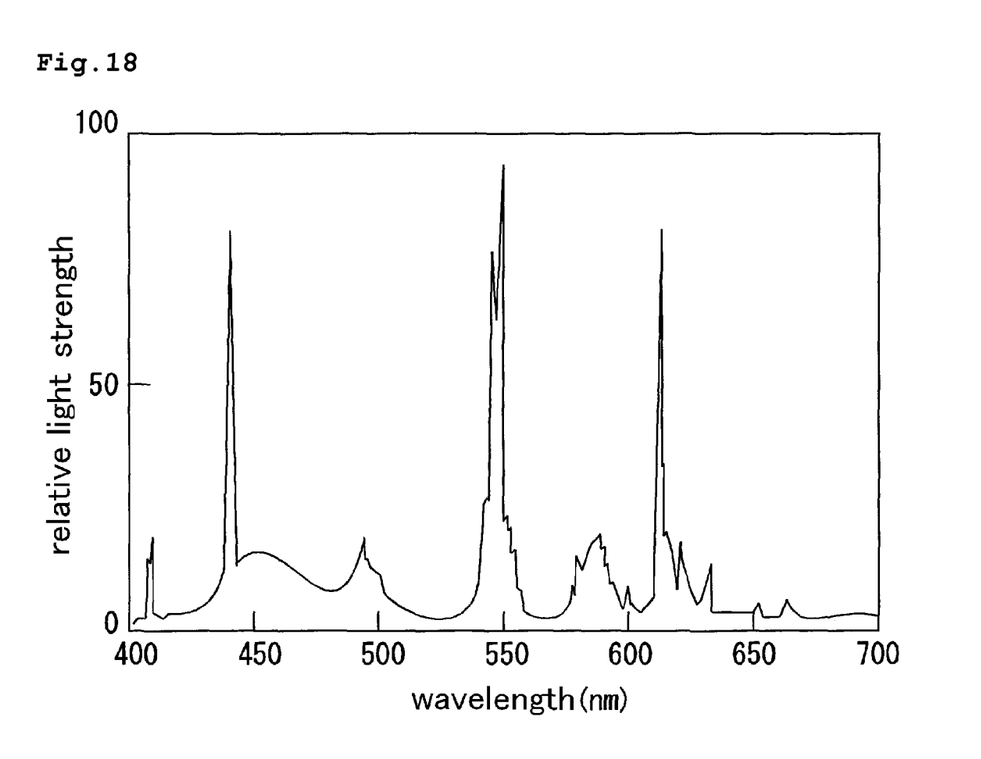
FIG. 18 shows an emission spectrum of a commonly use backlight.
Figure 19:
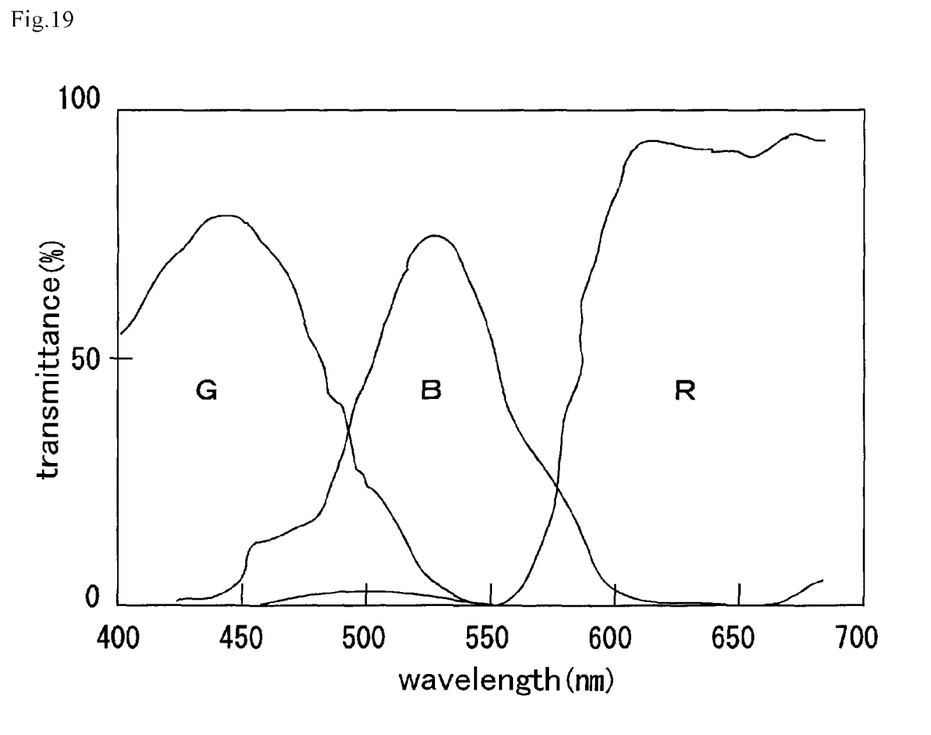
FIG. 19 shows transmission spectrums of commonly used color filters of red (R), green (G), and blue (B).

The white balance can be improved also by a change of backlight design. A typical backlight (three wavelength fluorescent tube) used in a color liquid crystal panel shows an emission spectrum shown in FIG. 18. A white light of the backlight passes through a color filter designed to allow only light with a wavelength of each color pass therethrough, thereby generating lights of respective colors. For example, if the backlight is designed in such a way that a light intensity of an emission spectrum with a wavelength corresponding to red (R) is doubled, an emission spectrum of light passing through a color filter in the red (R) sub-pixel is also doubled and therefore the brightness of the red (R) sub-pixel can be doubled. Alternatively, the backlight is designed in such a way that a light intensity of an emission spectrum with a wavelength corresponding to green (G) is halved, and thereby a transmitted light amount in each of one red (R) sub-pixel and one blue (B) sub-pixel can be relatively adjusted to be two times that of green (G).

Method for Improving White Balance 3: Change of Color Filter Design

The white balance can be improved also by change of color filter design. If the color filter design is changed in such a way that a transmitted light amount per each red (R) and blue (B) sub-pixels is two times that of green (G), the white balance shifted to green (G) can be improved. However, this method reduces a color purity of each sub-pixel, generally. That is, if the color filter design is changed in such a way that a transmittance of a color filter in the red (R) sub-pixel becomes larger and thereby the transmitted light amount per red (R) sub-pixel is increased, the transmittance in the color filter of the red (R) light increases. However, the color filter in the red (R) sub-pixel also transmits light with a wavelength other than that of red (R), and therefore transmittances of lights of other colors are also increased, resulting in reduction in color purity of red (R). Therefore, the method 3 is particularly effective for improvement in white balance if a color filter which increases the transmittance and prevents reduction in color purity can be designed.

(2) Average Processing of Image Signal

Image signals corresponding to red (R) and blue (B) sub-pixels need to be converted to correspond to the panel including the RGBG pixels according to a preferred embodiment of the present invention. That is, in the image signal of preferred embodiments of the present invention, individual signals need to be input into the green (G) sub-pixels disposed in the sub-pixel pairs. Generally, an image signal is generated for each color such that the sub-pixel pair is a signal unit, and the red (R) image signal which is input into the position corresponding to the sub-pixel pair of the blue (B) sub-pixel and the green (G) sub-pixel is not used for display. This is the same as in the blue (B) image signal input into the position corresponding to the sub-pixel pair of the red (R) sub-pixel and the green (G) sub-pixel. Therefore, if the red (R) and blue (B) image signals are input into the driving circuit in a conventional manner, some image signals are not used for display and the red (R) and blue (B) image signals which are used for display are half of the green (G) image signals.

Figure 4:
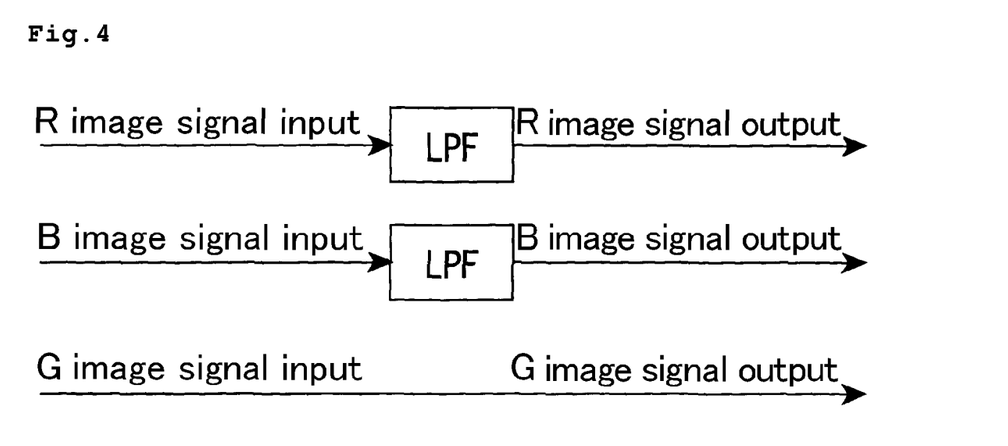
FIG. 4 is a schematic view showing a situation where only red (R) and blue (B) image signals pass through low pass filters (LPFs).

Accordingly, in a preferred embodiment of the present invention, as shown in FIG. 4, it is preferable that each of the red (R) sub-pixel and the blue (B) sub-pixel is driven by an averaged image signal obtained by subjecting two or more image signals corresponding to continuous sub-pixel pairs to average processing in a Low-Pass Filter. As a result, all of the red (R) and blue (B) image signals are used for display. Therefore, the red (R) and blue (B) image signals can be reflected in image display more faithfully, and the display quality can be improved.

The method of the average processing is described below in more detail.

Average Processing Method 1

Figure 5:
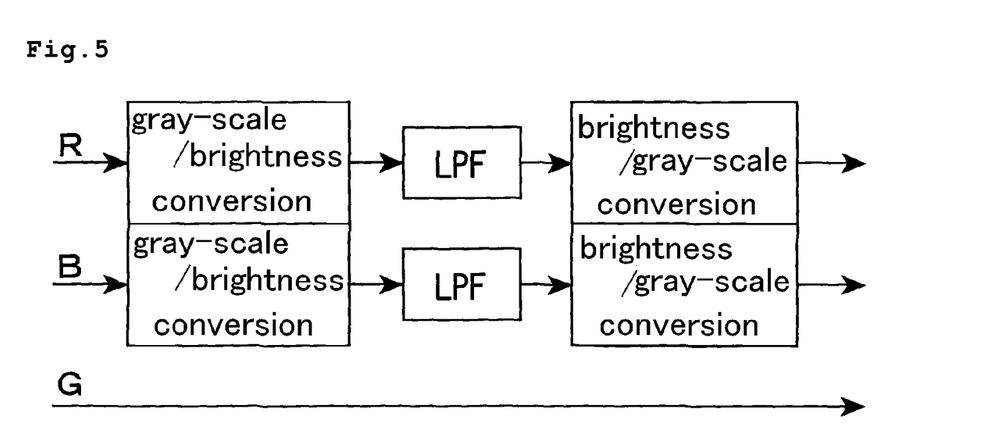
FIG. 5 is a schematic view showing a method of processing red (R) and blue (B) image signals before and after passing through LPFs.

The image signal is generally a tone data (tone value). The relationship between a tone value and a brightness value satisfies the following formula: [brightness value]=[tone value]$^{2.2}$ (1), and therefore an averaged tone value does not correspond to an averaged brightness value. For example, if a sub-pixel has a tone data of 255 tone (maximum brightness) and the next sub-pixel has a tone data of 0 tone (minimum brightness), an averaged value of the tone data is 127 tone when decimal numbers are truncated. Therefore, the brightness value when 127 tone is displayed seems to be an value obtained by averaging the brightness value when 127 tone is displayed and the brightness value when 255 tone is displayed. However, in the above formula (I), the brightness value when 127 tone is displayed accounts for about 21% of the maximum brightness value (=$(127/255)^{2.2}$), and therefore an ideal brightness value can not be obtained. Due to this, as shown in FIG. 5, in each of the red (R) image signal and the blue (B) image signal, the red (R) and blue (B) image signals are converted to brightness values before being input into the LPF, and then subjected to the average processing. After output from the LPF, the averaged value is converted to a tone data and then input into the driving circuit. As a result, each of the red (R) and blue (B) sub-pixels can obtain an ideal brightness value even if the average processing is performed.

Average Processing Method 2

If two or more image signals corresponding to continuous sub-pixel pairs are sampled and subjected to the average processing in a LPF, the sampling is performed in such a way that a combination of sub-pixel pairs used for the average processing is different between an image signal input into the red (R) sub-pixel and an image signal input into the blue (B) sub-pixel. For example, if the image signals input into the red (R) sub-pixel and the blue (B) sub-pixel are subjected to the average processing, the image signal pairs sampled differ by one sub-pixel pair between the red (R) image signal pair and the blue (B) image signal pair.

Figure 6:
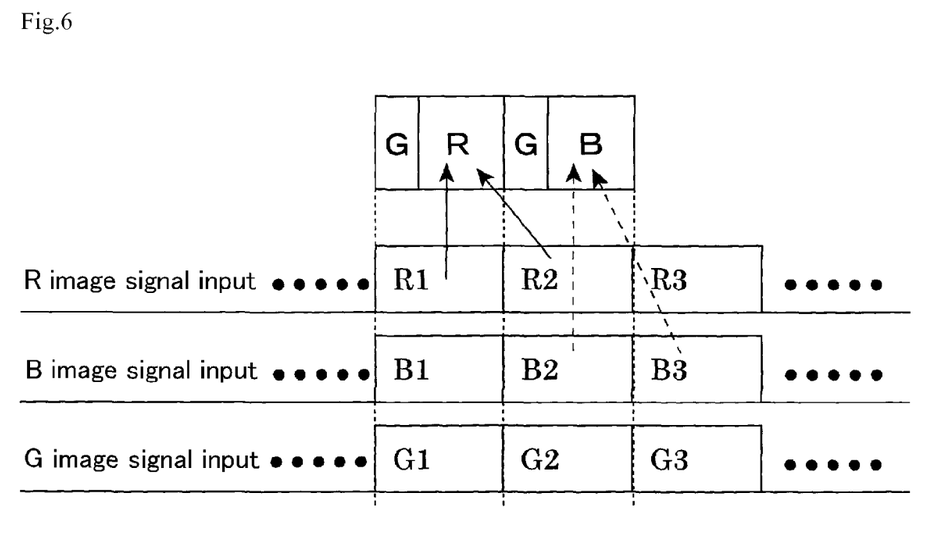
FIG. 6 is a schematic view showing a sub-pixel arrangement of the RGBG pixel and image signals corresponding to the arrangement.

FIG. 6 shows a sub-pixel arrangement according to a preferred embodiment of the present invention and image signals before the average processing, corresponding to the arrangement. In FIG. 6, R1 to R3, B1 to B3, and G1 to G3 show image signals input into red (R), blue (B), and green (G) sub-pixels, respectively. The signal unit of the image signal is the sub-pixel pair. If the same LPF is used for the average processing of the image signals input into the red (R) sub-pixel and the blue (B) sub-pixel, an averaged image signal obtained by subjecting R1 and R2 to the average processing as shown in the solid arrow in FIG. 6 is use as the image signal input into the red (R) sub-pixel. In this case, the red (R) sub-pixel is positioned between R1 and R2 used in the average processing, and thereby the averaged image signal corresponds to the arrangement of the sub-pixel.

Figure 7:
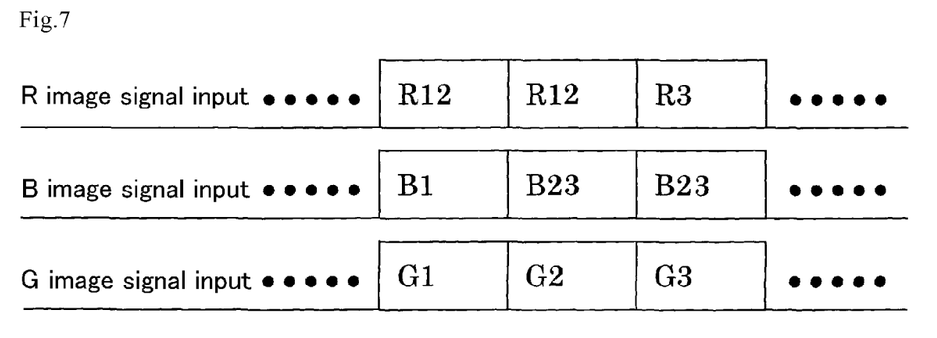
FIG. 7 is a schematic view showing averaged image signals corresponding to the sub-pixel arrangement of the RGBG pixel.

However, if B1 and B2 are subjected to the average processing to obtain a blue (B) averaged image signal as in the red (R) sub-pixel, it can not be said that the averaged image signal sufficiently corresponds to the sub-pixel arrangement because the blue (B) sub-pixel is not positioned between B1 and B2 used in the average processing. Instead, when B2 and B3 are subjected to the average processing to obtain a blue (B) averaged image signal as shown in the dashed arrow, the blue (B) sub-pixel is in the middle of the B2 and the B3 used in the average processing, and thereby the averaged image signal rather corresponds to the sub-pixel arrangement. Accordingly, different LPFs are used for the average processing of the image signals input into the red (R) sub-pixel and the blue (B) sub-pixel. In addition, as shown in FIG. 7, an averaged image signal R12 obtained by subjecting R1 and R2 to the average processing is used as the image signal input into the red (R) sub-pixel, and an averaged image signal B23 obtained by subjecting B2 and B3, which differs by one data unit, to the average processing, is used as the image signal input into the blue (B) sub-pixel. FIG. 7 shows a sub-pixel arrangement in the present preferred embodiment and averaged pixel signals corresponding to the arrangement.

(3) Input Method of Image Signal

Figure 8:
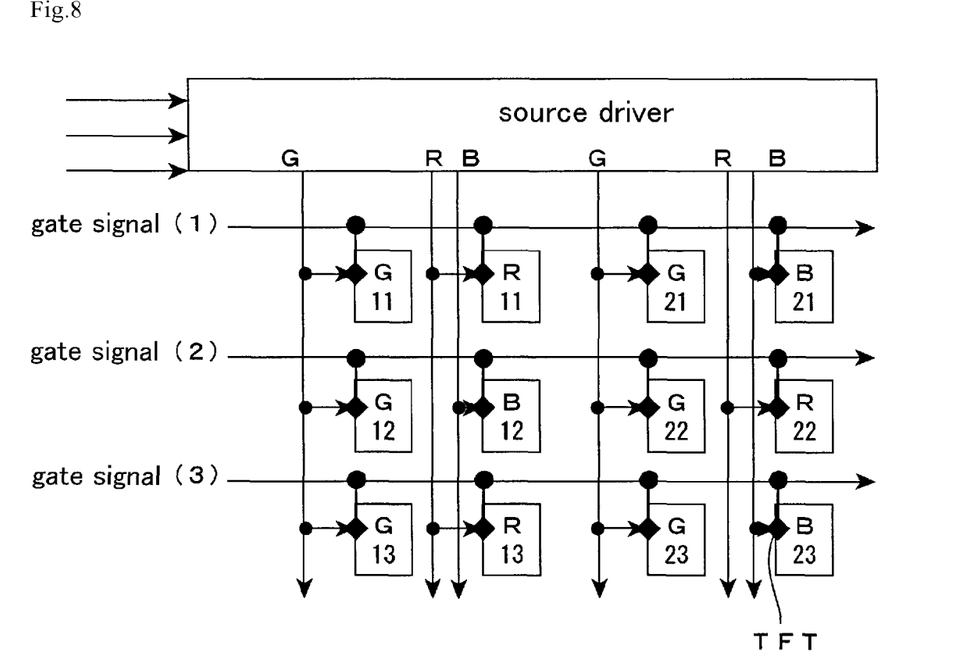
FIG. 8 is a schematic view showing a relationship among an image signal, a gate signal, and each sub-pixel in the RGBG pixel, if a driving circuit for RGB pixels is used.

FIG. 8 shows a relationship among a pixel signal, a gate signal, and each sub-pixel of the RGBG pixel. G11 to G13 and G21 to G23, R11 to R13, and B11 to B13 surrounded by the square in FIG. 8 show sub-pixels of green (G), red (R), and blue (B), respectively. The black rhombus in FIG. 8 shows a thin film transistor (TFT) for driving each sub-pixel. To the TFT, a data signal line (vertical wiring) for supplying an image signal for controlling a voltage of an electrode (pixel electrode) in the sub-pixel and a gate signal line (horizontal wiring) for supplying a gate signal for controlling writing of the image signal are connected. That is, each sub-pixel is driven by the image signal and the gate signal. For example, G11 can be driven by the gate signal (1) sent to the gate signal line and the green (G) image signal sent to the data signal line.

Figure 9:
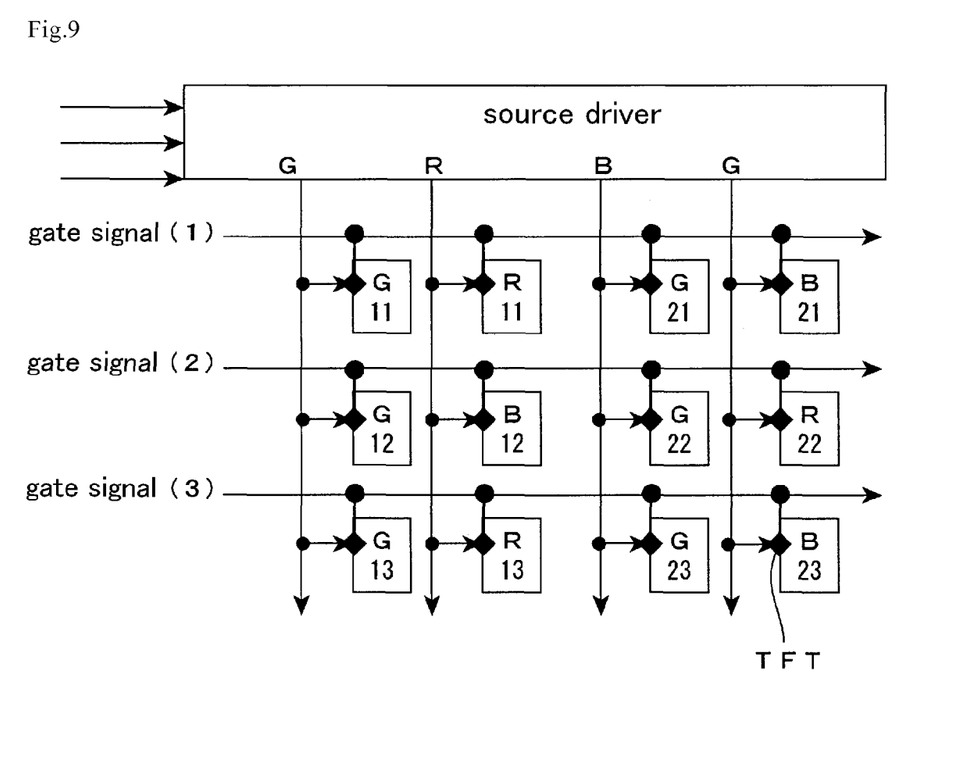
FIG. 9 is a schematic view showing a relationship among an image signal, a gate signal, and each sub-pixel in the RGBG pixel, if red (R) and blue (B) are connected to a common source signal line in FIG. 8.

In FIG. 8, a red (R) sub-pixel and a blue (B) sub-pixel are alternately disposed on the same vertical line and two data signal lines are formed for driving sub-pixels on the same vertical line. In contrast, in the present preferred embodiment, two data signal lines connected to the red (R) sub-pixel and the blue (B) sub-pixel are united to form one date signal line, as shown in FIG. 9. As a result, the data signal line corresponding to the sub-pixel arrangement of a preferred embodiment of the present invention can be secured without any increase in the data signal line. FIG. 9 shows a relationship among an image signal, a gate signal, and each sub-pixel of the RGBG pixel in the present preferred embodiment.

Figure 10:
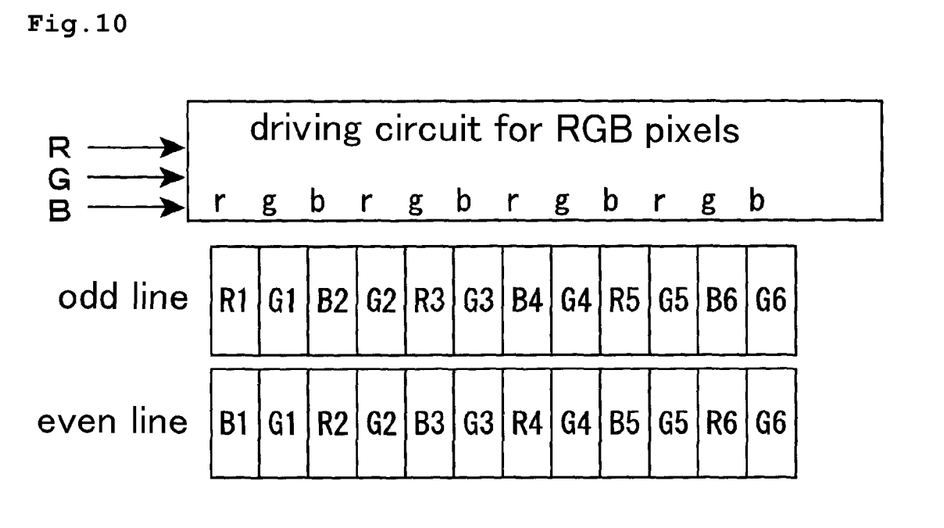
FIG. 10 is a schematic view showing a relationship between an image signal and each sub-pixel of the RGBG pixel if red (R) and blue (B) are connected to a common source signal line in FIG. 8.

FIG. 10 is a view showing a relationship between an image signal output from a commonly used driving circuit (source driver) for RGB pixels and an array of sub-pixels in the horizontal direction. In FIG. 10, small alphabetic characters, r, g, and b described on the driving circuit for RGB pixels respectively show the positions of the data signal lines from which the red (R), green (G), and blue (B) image signals input into the driving circuit are output. R1 to R6, G1 to G6, and B1 to B6 show red (R), green (G), and blue (B) sub-pixels, respectively. As shown in FIG. 9, if the red (R) sub-pixel and the blue (B) sub-pixel are connected to a common data signal line, the image signals output from the driving circuit (source driver) for RGB pixels do not correspond to the sub-pixels, as shown in FIG. 10. For example, in FIG. 10, a red (R) image signal is output from the data signal line corresponding to the small alphabetical letter r that is the fourth from left, but the sub-pixel arranged on the data signal line is G2, and the image signal output from the driving circuit does not correspond to the sub-pixel.

Figure 11A:
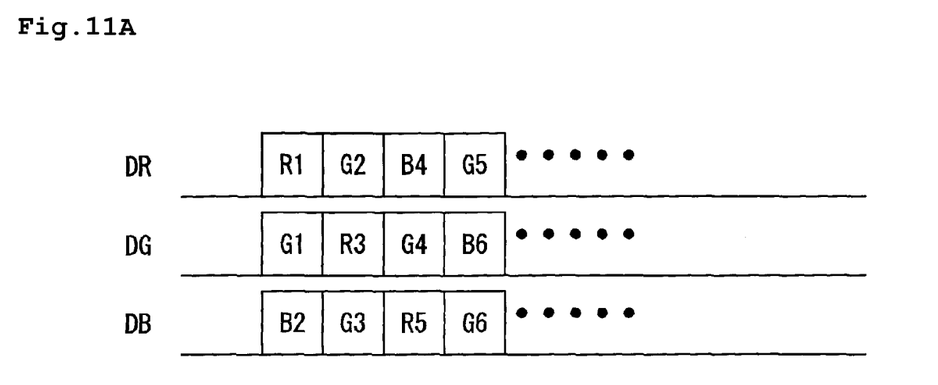
FIGS. 11A and 11B are schematic views each showing image signals rearranged before being input into a driving circuit for RGB pixels.
Figure 11B:
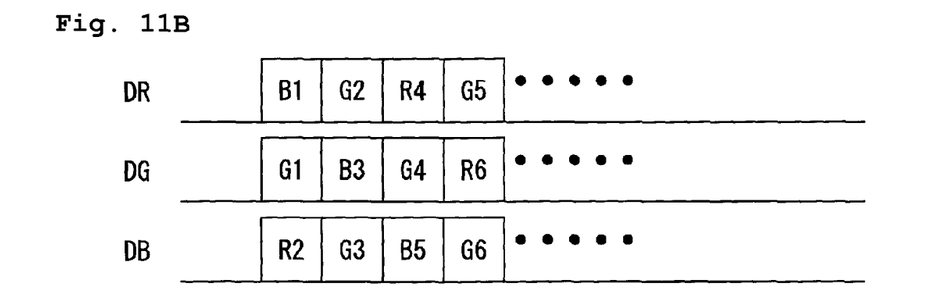

As an input method of the image signal in such a case where a common data signal line is used, a method in which the image signals are rearranged before being input into the driving circuit may be mentioned. In this case, the image signals input into the sub-pixels in the odd line are rearranged before being input into the driving circuit, as shown in FIG. 11A, and the image signals input into the sub-pixels in the even line are rearranged as shown in FIG. 11B. As a result, if the red (R) sub-pixel and the blue (B) sub-pixel are connected to a common data signal line, the image signal output from the driving circuit can correspond to the sub-pixel. The pixels in the sub-pixel arrangement in the present preferred embodiment can display images.

Figure 12:
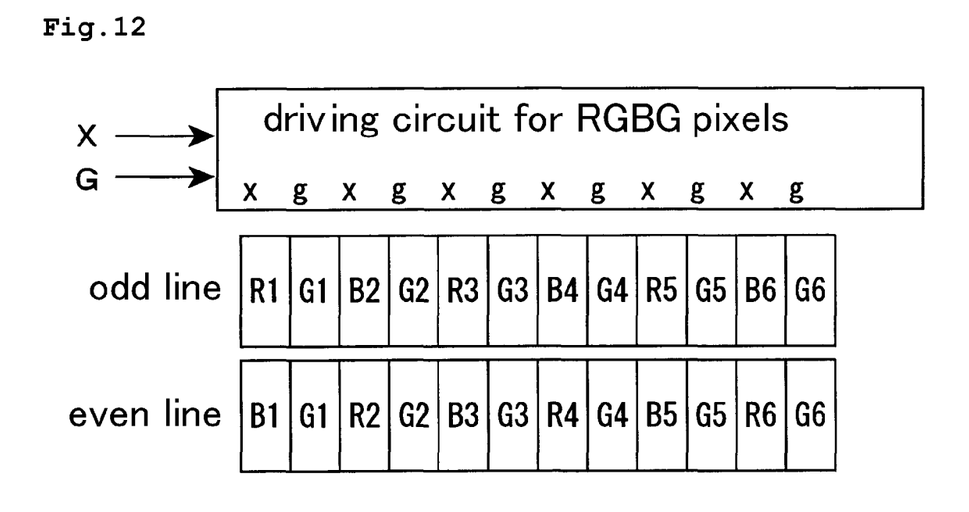
FIG. 12 is a schematic view showing a relationship between an image signal and each sub-pixel of the RGBG pixel if red (R) and blue (B) are connected to a common source signal line in FIG. 8.

A method of using a special driving circuit for RGBG pixels, which is different from the commonly used driving circuit for RGB pixels, is also described. In this case, as shown in FIG. 12, a driving circuit having an input side to which first and second input lines are connected and an output side to which first and second data signal lines are connected preferably is used. In FIG. 12, a large alphabetical letter X shows the first data signal corresponding to the red (R) and blue (B) image signals, and a large alphabetical letter G shows the second data signal corresponding to the green (G) image signal. Small alphabetical letters x and g described on the driving circuit for RGBG pixels respectively show positions of the first and second data signal lines, where the first data signal and the second data signal input into the driving circuit are output. The first input line supplies the first data signal (X) corresponding to the red (R) and blue (B) sub-pixels to the first data signal line. The second input line supplies the second data signal corresponding to the green (G) sub-pixel to the second data signal line (G).

Figure 13A:
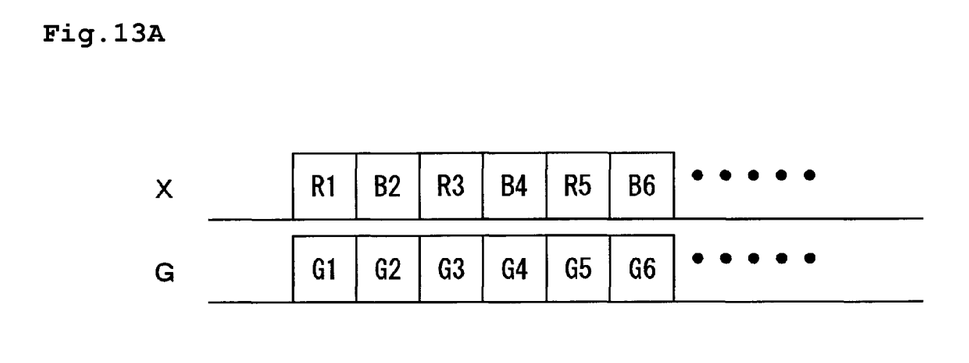
FIGS. 13A and 13B are schematic views each showing image signals rearranged before being input into a driving circuit for RGBG pixels.
Figure 13B:
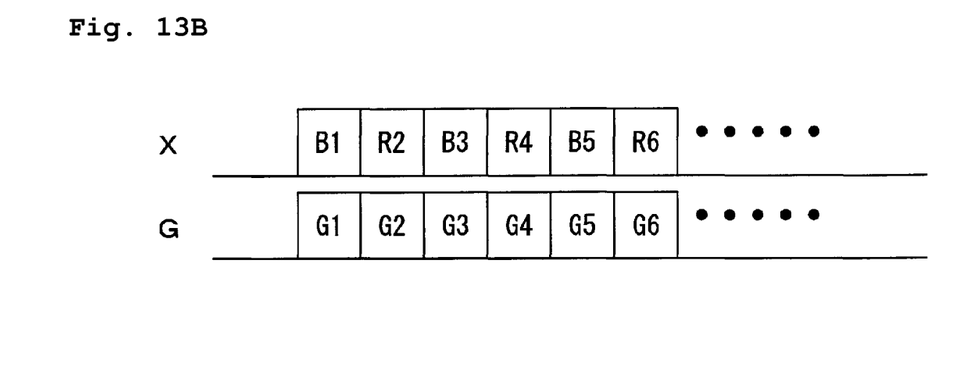

In order to display images by such a special driving circuit for RGBG pixels, the image signals input into the sub-pixels in the odd line are rearranged as shown in FIG. 13A, and those input into the sub-pixels in the even line are rearranged as shown in FIG. 13B, before being input into the driving circuit.

As a result, if the red (R) sub-pixel and the blue (B) sub-pixel are connected to a common data signal line, the image signal output from the driving circuit can correspond to the sub-pixel, and the pixel in the sub-pixel arrangement in the present preferred embodiment can display images.

(4) Polarity of Tone Voltage

Figure 14A:
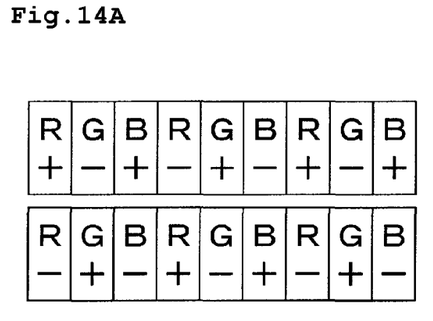
FIGS. 14A and 14B are schematic views each showing a polarity of a tone voltage applied to a sub-pixel if the polarity inversion driving is performed for a commonly used RGB pixel array.
Figure 14B:
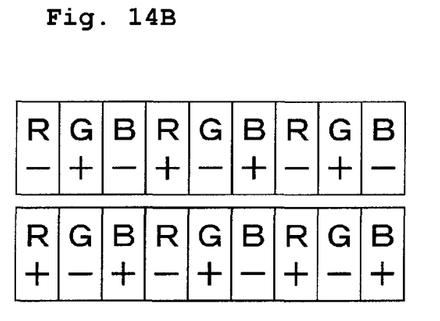

FIGS. 14A and 14B show distributions of a polarity of a tone voltage applied to a sub-pixel in commonly used RGB pixel polarity inversion driving (dot inversion driving). In FIGS. 14A and 14B, + and − each show a polarity of the tone voltage applied to the sub-pixel. FIG. 14A shows an N frame (N is a natural number), and FIG. 14B shows an N+1 frame (also in FIGS. 14A to 17B). In the commonly used polarity inversion driving, the polarity of the tone voltage applied to a sub-pixel is inverted between sub-pixels, lines, and frames. That is, if the red (R) sub-pixel is noted, a red (R) sub-pixel next to the noted sub-pixel in the same line (in the horizontal direction) has an inverse polarity to that of the tone voltage applied to the noted sub-pixel. In the vertical direction, the polarity of the tone voltage applied to the red (R) sub-pixel is inverted between the odd line and the even line. Further, the polarity of the tone voltage applied to the red (R) sub-pixel is inverted between an N frame and an (N+1) frame.

Figure 15A:
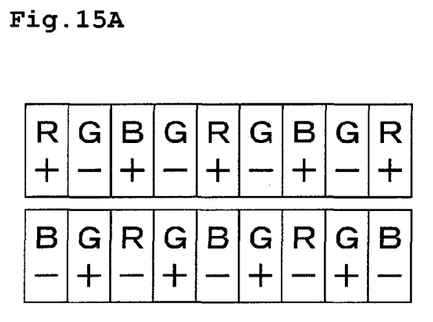
FIGS. 15A and 15B are schematic views each showing a polarity of a tone voltage applied to a sub-pixel if the commonly performed driving in which a polarity is inverted between sub-pixels is performed for an RGBG pixel array.
Figure 15B:
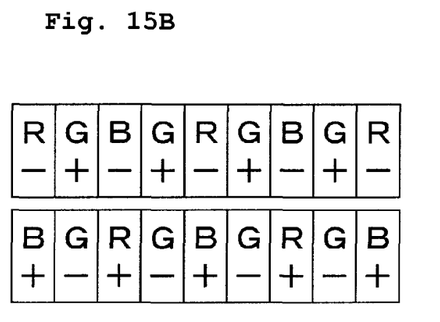
Figure 16A:
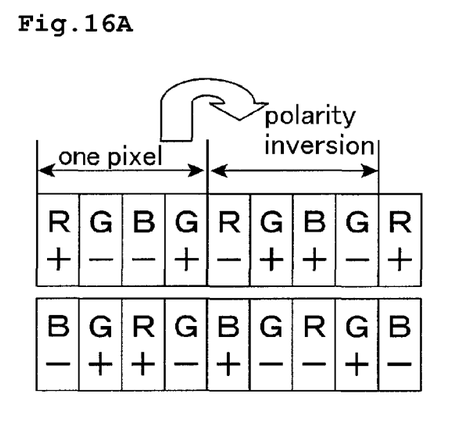
FIGS. 16A and 16B are schematic views each showing a polarity of a tone voltage applied to a sub-pixel if polarity inversion driving for each pixel (four sub-pixels) is performed for the RGBG pixel array.
Figure 16B:
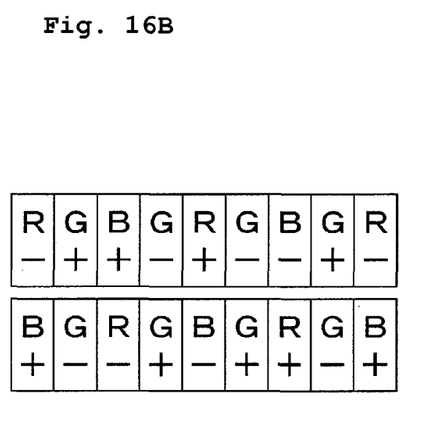

The brightness is slightly different between display on the positive polarity side and that on the negative polarity side, because the pixel electrode has different electric potentials between in the positive polarity state and in the negative polarity state because of a parasitic capacity in the TFT and the like. Therefore, it is preferable that the polarity is inverted between the adjacent sub-pixels of the same color in the horizontal or vertical direction, as in the dot inversion driving in commonly used RGB pixels. However, if the commonly used dot inversion driving is performed when the RGBG pixels of the present preferred embodiment display an image, as shown in FIGS. 15A and 15B, the polarity of the voltage applied to the sub-pixels of the respective colors on the same line is always the same. In the present preferred embodiment, as shown in FIGS. 16A and 16B, the polarity of the tone voltage applied to the sub-pixels is inverted between pixels (four sub-pixels), lines, and frames. As a result, the sub-pixels of the same color on the same line are prevented from having the same polarity of the tone voltage.

(5) Color Array of Sub-Pixels

Figure 17A:
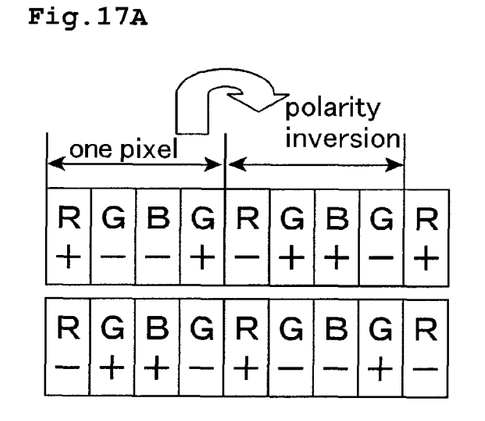
FIGS. 17A and 17B are schematic views each showing a polarity of a tone applied to a sub-pixel if the driving in which a polarity is inverted between pixels (four sub-pixels) is performed for another example of the RGBG pixel array.
Figure 17B:
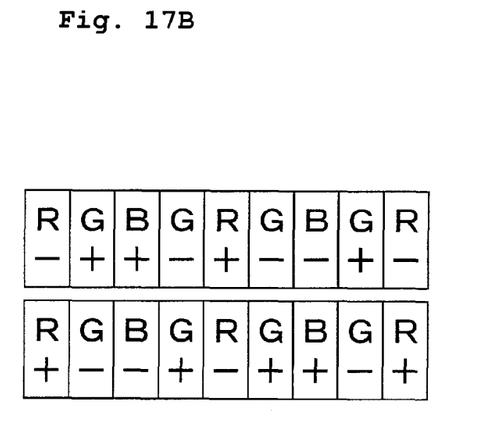

If the driving system in the present preferred embodiment is applied to a panel configuration in which sub-pixels of the respective colors are arranged in a stripe pattern, as shown in FIGS. 17A and 17B, the same effects can be obtained. For example, if the red (R) and blue (B) sub-pixels are alternately arranged in the vertical direction, a red straight line in the vertical direction is displayed in a zigzag manner, which causes visual discomfort. Such display is often used in a personal computer and the like. However, as shown in FIGS. 17A and 17B, according to the stripe pattern pixel configuration in which the sub-pixels of the same color are arranged in the vertical direction, a straight line display of a single color displayed in the vertical direction can be prevented from being displayed in a zigzag manner.

This Non-provisional application claims priority (under 35 U.S.C. §119) of Japanese Patent Application No. 2005-125382 filed in Japan on Apr. 22, 2005, the entire contents of which are hereby incorporated by reference.

The term "or more" in the present description includes the value described. That is, the term "or more" means the described value and values more than the described value.

While preferred embodiments of the present invention have been described above, it is to be understood that varia- tions and modifications will be apparent to those skilled in the art without departing the scope and spirit of the present invention. The scope of the present invention, therefore, is to be determined solely by the following claims.

The invention claimed is:

1. A display device comprising:
a first pixel and a second pixel;
the first pixel including:
a first sub-pixel pair of a red sub-pixel and a green sub-pixel; and
a second sub-pixel pair of a blue sub-pixel and a green sub-pixel, the second sub-pixel pair being adjacent to the first sub-pixel pair;
the second pixel including a third sub-pixel pair of a red sub-pixel and a green sub-pixel, the third sub-pixel pair being adjacent to the second sub-pixel pair; wherein
in the first pixel and the second pixel, a product of an aperture area per sub-pixel and a light amount per unit aperture area, in each of the red sub-pixel and the blue sub-pixel, is approximately two times that of the green sub-pixel;
an image signal input into the red sub-pixel of the first sub-pixel pair is obtained by averaging a red image signal for the first sub-pixel pair and a red image signal for the second sub-pixel pair;
an image signal input into the blue sub-pixel of the second sub-pixel pair is obtained by averaging a blue image signal for the second sub-pixel pair and a blue image signal for the third sub-pixel pair; and
image signals input into the green sub-pixel of the first sub-pixel pair, the green sub-pixel of the second sub-pixel pair, and the green sub-pixel of the third sub-pixel pair are green image signals for the first sub-pixel pair, the second sub-pixel pair, and the third sub-pixel pair, respectively.

2. The display device according to claim 1, wherein in the first pixel and in the second pixel, the aperture area per sub-pixel in each of the red sub-pixel and the blue sub-pixel is approximately two times that of the green sub-pixel.

3. The display device according to claim 1, wherein in the first pixel and in the second pixel, the light amount per unit aperture area in each of the red sub-pixel and the blue sub-pixel is approximately two times that of the green sub-pixel.

4. The display device according to claim 3, wherein the display device includes a backlight, and in the backlight, an emission intensity of each of the red sub-pixels and the blue sub-pixels is approximately two times that of the green sub-pixels.

5. The display device according to claim 1, wherein the sub-pixels are arranged in the order of one of the red sub-pixels, one of the green sub-pixels, the blue sub-pixel, and another one of the green sub-pixels.

6. The display device according to claim 1, wherein an image signal input into the red sub-pixel of the first sub-pixel pair is obtained by converting the red image signal for the first sub-pixel pair and the red image signal for the second sub-pixel pair from tone values to brightness values, obtaining an averaged value from the brightness values, and reconverting the averaged value to a tone value.

7. The display device according to claim 1, wherein the red sub-pixels and the blue sub-pixels are connected to a common data signal line.

8. The display device according to claim 7, further comprising a driving circuit having an input side to which first and second input lines are connected and an output side to which first and second data signal lines are connected, wherein the first input line supplies a mixed signal of image signals corresponding to the red sub-pixels and the blue sub-pixels to the first data signal line, and the second input line supplies an image signal corresponding to the green sub-pixels to the second data signal line.

9. The display device according to claim 7, wherein the display device includes a driving circuit having an input side to which first, second, and third input lines are connected and an output side to which data signal lines are connected, and each of the first, second, and third input lines supplies a mixed signal of image signals corresponding to the red sub-pixels, the green sub-pixels, and the blue sub-pixels to the data signal lines.

10. The display device according to claim 1, wherein the display device has a display portion including pixels arranged in a grid pattern and a polarity of a tone voltage applied to a sub-pixel is inverted between adjacent pixels, lines, and frames.

11. A display device comprising:
a first pixel and a second pixel;
the first pixel including:
   a first sub-pixel pair of a red sub-pixel and a green sub-pixel; and
   a second sub-pixel pair of a blue sub-pixel and a green sub-pixel, the second sub-pixel pair being adjacent to the first sub-pixel pair;
the second pixel including a third sub-pixel pair of a red sub-pixel and a green sub-pixel, the third sub-pixel pair being adjacent to the second sub-pixel pair; wherein
an image signal input into the red sub-pixel of the first sub-pixel pair is obtained by averaging a red image signal for the first sub-pixel pair and a red image signal for the second sub-pixel pair;
an image signal input into the blue sub-pixel of the second sub-pixel pair is obtained by averaging a blue image signal for the second sub-pixel pair and a blue image signal for the third sub-pixel pair; and
image signals input into the green sub-pixel of the first sub-pixel pair, the green sub-pixel of the second sub-pixel pair, and the green sub-pixel of the third sub-pixel pair are green image signals for the first sub-pixel pair, the second sub-pixel pair, and the third sub-pixel pair, respectively.

* * * * *